US011047834B2

(12) United States Patent
Yamazaki

(10) Patent No.: US 11,047,834 B2
(45) Date of Patent: Jun. 29, 2021

(54) PREPARATIVE LIQUID CHROMATOGRAPH

(71) Applicant: Shimadzu Corporation, Kyoto (JP)

(72) Inventor: Tomoyuki Yamazaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 95 days.

(21) Appl. No.: 16/315,936

(22) PCT Filed: Jul. 6, 2016

(86) PCT No.: PCT/JP2016/070034
§ 371 (c)(1),
(2) Date: Jan. 7, 2019

(87) PCT Pub. No.: WO2018/008114
PCT Pub. Date: Jan. 11, 2018

(65) Prior Publication Data
US 2019/0302065 A1  Oct. 3, 2019

(51) Int. Cl.
*B01D 15/22* (2006.01)
*B01D 15/42* (2006.01)
(Continued)

(52) U.S. Cl.
CPC .............. *G01N 30/06* (2013.01); *B01D 15/22* (2013.01); *B01D 15/424* (2013.01); *G01N 30/62* (2013.01);
(Continued)

(58) Field of Classification Search
CPC ........ G01N 30/06; G01N 30/62; G01N 30/80; G01N 2030/065; G01N 2030/201; G01N 2030/202; B01D 15/22; B01D 15/424
See application file for complete search history.

(56) References Cited

U.S. PATENT DOCUMENTS

2009/0314716 A1\* 12/2009 Osaka .................... G01N 30/82
210/656
2016/0061787 A1\* 3/2016 Vasdev ................ G01N 30/468
73/61.55

FOREIGN PATENT DOCUMENTS

CN 205049535 U 2/2016
JP 2003149217 A \* 5/2003
(Continued)

OTHER PUBLICATIONS

JP-2003-149217, machine translation. Jul. 17, 2020.\*
(Continued)

*Primary Examiner* — Benjamin L Lebron
(74) *Attorney, Agent, or Firm* — Muir Patent Law, PLLC

(57) ABSTRACT

A preparative liquid chromatograph that separates components in a sample in a separating column and captures a plurality of target components in an eluate from the separating column in individual trap columns, includes: a column switching means configured to switch passages to cause the eluate having been eluted from the separating column and passed through a detector to selectively flow into one of the trap columns, a passage switching means disposed in a passage between the detector and the column switching means and configured to switch between a first state in which the eluate flows to the column switching means and a second state in which the eluate is discharged without flowing to the column switching means. For the switching among the trap columns, the passage switching means and the column switching means are controlled to set the passage switching means in the second state (step S17) before performing the switching operation of the column switching means (step S18). This prevents entry of a target component into a wrong trap column during the switching among the trap columns.

15 Claims, 6 Drawing Sheets

(51) Int. Cl.
*G01N 30/06* (2006.01)
*G01N 30/62* (2006.01)
*G01N 30/80* (2006.01)
G01N 30/20 (2006.01)

(52) U.S. Cl.
CPC ....... *G01N 30/80* (2013.01); *G01N 2030/065* (2013.01); *G01N 2030/201* (2013.01); *G01N 2030/202* (2013.01)

(56) References Cited

FOREIGN PATENT DOCUMENTS

| | | |
|---|---|---|
| JP | 3719407 B | 11/2005 |
| JP | 2010-008047 A | 1/2010 |

OTHER PUBLICATIONS

Written Opinion (ISA237) dated Sep. 20, 2016 for application PCT/JP2016/070034 and machine translation.
First Chinese Office Action dated Apr. 8, 2020 for the corresponding Chinese Patent Application No. 201680087426.2, submitted with a machine translation.

\* cited by examiner

PREPARATIVE LIQUID CHROMATOGRAPH

TECHNICAL FIELD

The present invention relates to a preparative liquid chromatograph that separates a plurality of components in a column of a liquid chromatograph and captures the separated components in individual trap columns.

BACKGROUND ART

In the pharmaceutical field, for example, preparative liquid chromatographs employing liquid chromatographs are used to collect various chemical compounds as samples to be stored in a library or to be analyzed in detail. Patent Document 1, for example, discloses an apparatus as one of these preparative liquid chromatographs.

These conventional apparatuses temporally separate target components (compounds) in a sample solution by a liquid chromatograph and introduce the separated components into individual trap columns to temporarily capture the components in the trap columns.

FIG. 9 shows a structure of a conventional preparative liquid chromatograph. In this preparative liquid chromatograph, a first mobile phase (e.g. water) stored in a first mobile phase container 211 is pumped to a mixer 215 by a first mobile phase pump 213 at a predetermined rate, and a second mobile phase (e.g. acetonitrile) stored in a second mobile phase container 212 is pumped to the mixer 215 by a second mobile phase pump 214 at a predetermined rate. The first and second mobile phases are then mixed in the mixer 215 and sent to a separating column 217. A sample is injected into the mobile phase by an injector 216. The sample is then carried by the mobile phase into the separating column 217. While the sample is passing through the separating column 217, the components in the sample are temporally separated and eluted to be successively introduced into a detector 218. The detector 218 is an ultraviolet and visible spectrophotometer, for example, and outputs a detection signal indicative of the components in the eluate from the separating column 217.

Downstream of the detector 218, a column switching valve 220 is provided. By operating the column switching valve 220, a supply passage 229 in connection with a port g of the column switching valve 220 is connected to one of trap columns 221 to 225 via respective ports a to e, respectively, or to a drain passage 226 via a port f.

Downstream of the trap columns 221 to 225 and the drain passage 226, a downstream switching valve 227 is provided. The downstream switching valve 227 is operated interlockingly with the column switching valve 220. The interlocked operation of the two valves 220 and 227 connects one of the trap columns 221 to 225 and the drain passage 226 connected to the supply passage 229 via the column switching valve 220 to an outlet passage 228 on the downstream side.

To surely capture target components in the trap columns, the solvent (i.e. the mobile phase) for introducing the target components into the trap columns should preferably have as low an eluting ability as possible. When the trap columns are in a reversed-phase mode, for example, the absorbent packed in the trap columns is hydrophobic and the mobile phase is hydrophilic. Generally, increasing the hydrophilicity of the mobile phase facilitates the retention of the target components by the absorbent. In a preparative liquid chromatograph, the eluate containing a target component separated from the other components in the separating column is mixed, in an upstream vicinity of the entrance of a trap column, with a diluent such as water pumped by another pump before being introduced into the trap column. This addition of a diluent to a mobile phase dilutes the mobile phase and reduces the eluting ability of the mobile phase. In the example in FIG. 9, the piping extending from a diluent pump 232 is connected to the close upstream of the trap columns 221 to 225 and to the drain passage 226 via a column switching valve for diluent 233. By operating the column switching valve for diluent 233, the diluent stored in a diluent container 231 is selectively supplied to one of the trap columns 221 to 225 or the drain passage 226. When the eluate contains a high concentration of a target component, the dilution of the eluate by the addition of a diluent brings about an additional effect of preventing the piping from clogging with deposition of the target component.

In a preparative liquid chromatograph as above, the detector 218 sends the detection signal to a control/processing unit 241. Based on the signal, the control/processing unit 241 generates a chromatogram in which the horizontal axis shows a retention time and the vertical axis shows the intensity of the signal. When the control/processing unit 241 determines no peak of a target component in the chromatogram, the control/processing unit 241 operates the column switching valve 220 and the downstream switching valve 227 to connect the supply passage 229 with the outlet passage 228 via the drain passage 226. In this case, the eluate containing no target component from the detector 218 passes through the ports g and f of the column switching valve 220 and the drain passage 226 to be discharged from the outlet passage 228.

When the control/processing unit 241 determines the peak of a target component in the chromatogram, the control/processing unit 241 operates the column switching valve 220 and the downstream switching valve 227, upon the arrival of the target component at the start point of its peak at the column switching valve 220, to connect a predetermined trap column, for example, the trap column 223 with the supply passage 229 and with the outlet passage 228. In this case, the eluate containing the target component from the detector 218 passes through the ports g and c of the column switching valve 220 and enters the trap column 223. While the eluate is passing through the trap column 223, the absorbent in the trap column 223 captures the target component in the eluate.

The above procedure is repeated several times and the trap columns 221 to 225 capture different target components. The trap columns 221 to 225 are then supplied with an elution solvent (e.g. dichloromethane), which elutes the components captured in the trap columns in a short time. The solutions containing the target components at high concentrations are then collected in containers. The collected solutions may, in one method, then be vapored and dried to remove the solvent and collect the target components in solid forms.

CITATION LIST

Patent Literature

Patent Literature 1: JP 2010-008047 A

SUMMARY OF INVENTION

Technical Problem

In preparative separation/purification using a preparative liquid chromatograph as described above, a target component should preferably be collected at high purity. Especially in collection of a sample in the pharmaceutical field, there is a high demand for preparative separation/purification that enables the sample collection at higher purity. In a conventional preparative liquid chromatograph, however, a target component collected from one of the trap columns may contain different target components that should have been captured in another trap column, though in a small amount.

The present invention has been made to solve the above problem. An object of the present invention is to provide a preparative liquid chromatograph that prevents a target component to be captured in a predetermined trap column from entering a wrong trap column.

Solution to Problem

The inventor has found, through close examination, that the switching operation of the column switching valve may cause the entry of the eluate from the separating column into a wrong trap column in the above conventional preparative liquid chromatograph. An example will be described with reference to FIG. 9 on the case in which the connection of the supply passage 229 to the drain passage 226 is switched to the trap column 223. In this switching operation, the column switching valve 220 switches the connection destination of the port g from the port f to the port c. During the switching operation, an end of the passage inside the valve (referred to as an "intra-valve passage" hereinafter) comes into contact with the ports d and e in a very short time. By the time of the contact, the eluate containing the target component to be captured in the trap column 223 has already passed through the supply passage 229 and entered the intra-valve passage in part. The contact of the end of the intra-valve passage with the ports d and e thus causes a very small amount of the target component present in the intra-valve passage to enter the trap columns 224 and 225.

The inventor has made further efforts to solve the problem of the entry of a target component into a wrong trap column and succeeded to make the present invention.

To solve the above problem, the present invention provides a preparative liquid chromatograph including:

a) a liquid chromatograph including a separating column configured to separate components in a sample and a detector configured to detect components in an eluate from the separating column;

b) a plurality of trap columns configured to capture respective target components in the eluate;

c) a column switching means configured to switch passages to cause an eluate having passed through the detector to selectively flow into one of the plurality of trap columns, d) a passage switching means disposed in a passage between the detector and the column switching means and configured to switch between a first state in which the eluate flows to the column switching means, and a second state in which the eluate is discharged without flowing to the column switching means, and e) a control means configured to control the passage switching means and the column switching means, for a switching operation of the column switching means, to firstly set the passage switching means in the second state, secondly perform the switching operation of the column switching means, and thirdly reset the passage switching means to the first state.

The preparative liquid chromatograph according to the present invention includes the passage switching means upstream of the column switching means (corresponding to the above column switching valve), and operates the passage switching means to prevent the entry of the eluate from the separating column into the column switching means before performing the switching operation of the column switching means. This enables the switching operation of the column switching means while a target component to be captured in a trap column is not present in the intra-valve passage, which prevents the entry of the target component into a wrong trap column during the switching operation.

To solve the above problem, the preparative liquid chromatograph according to the present invention may further include:

f) a drain passage disposed parallel to the plurality of trap columns.

In the preparative liquid chromatograph, the column switching means may switch passages to cause an eluate having passed through the detector to selectively flow into one of the plurality of trap columns or the drain passage.

The preparative liquid chromatograph according to the present invention preferably further include:

g) a diluent supplier configured to supply a diluent, and h) a second column switching means configured to switch passages to cause the diluent to selectively flow into one of the plurality of trap columns.

In the preparative liquid chromatograph, the passage switching means is disposed in a passage between the detector and the column switching means and in a passage between the diluent supplier and the second column switching means, the passage switching means connects the detector with the column switching means and connects the diluent supplier with the second column switching means in the first state, and the passage switching means connects the detector with a first drain passage and connects the diluent supplier with a second drain passage in the second state.

In the present invention, for the switching among the plurality of trap columns, firstly the passage switching means is set in the second state, secondly the switching operation of the column switching means is performed, and thirdly the passage switching means is reset to the first state as described above. The switching among the trap columns thus takes a longer time as compared to conventional preparative liquid chromatographs. When the retention times of a plurality of target components are close to each other, the capture of the target component eluted later may be failed in part due to the switching among the trap columns taking place between the capture of the target component eluted earlier and the capture of the target component eluted later.

In the preparative liquid chromatograph according to the present invention, the control means may perform a first operation mode in which the control means controls the passage switching means and the column switching means to perform the switching operation of the column switching means while the passage switching means is in the first state; and a second operation mode in which the control means controls the passage switching means and the column switching means to firstly set the passage switching means in the second state, secondly perform the switching operation of the column switching means, and thirdly reset the passage switching means to the first state. The preparative liquid chromatograph may further include:

i) a setting means for allowing a user to select between the first operation mode and the second operation mode in advance when collecting a target component in the sample.

With this structure, the user can select between the first operation mode and the second operation mode to be applied to the switching among the trap columns in advance. For example, when the collection efficiency of a target component is important, the user can apply the first operation mode, and when the purity of a target component is important, the user can apply the second operation mode.

Advantageous Effects of Invention

As described above, the present invention provides a preparative liquid chromatograph that prevents the entry of a target component into a wrong trap column during the switching among the trap columns, and collects the target component at high purity.

DESCRIPTION OF EMBODIMENTS

Embodiments of the present invention will now be described by way of examples.

Embodiment

Figure 1:
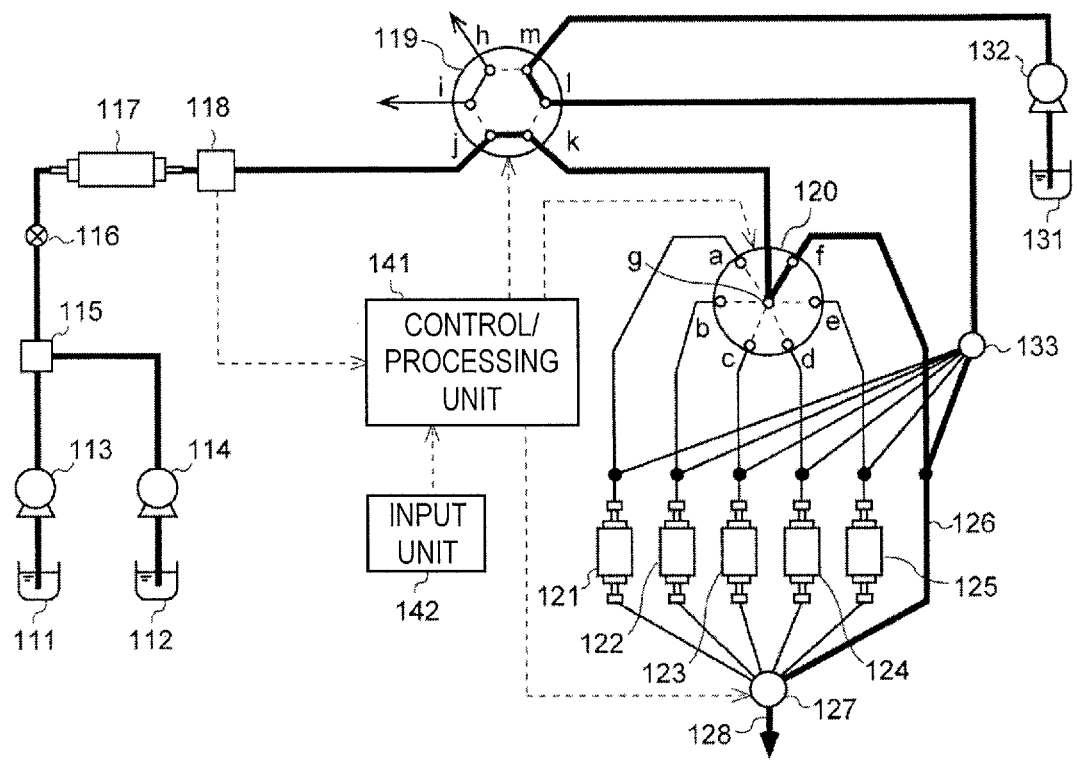
FIG. 1 is a schematic diagram of a structure of a preparative liquid chromatograph according to an embodiment of the present invention showing a state in which an eluate and a diluent are flowing through a drain passage.

FIG. 1 is a schematic diagram of a structure of a preparative liquid chromatograph according to an embodiment of the present invention. This preparative liquid chromatograph includes: a first mobile phase container 111 containing a first mobile phase, a second mobile phase container 112 containing a second mobile phase different from the first mobile phase, a first mobile phase pump 113 configured to pump the first mobile phase, a second mobile phase pump 114 configured to pump the second mobile phase, a mixer 115 configured to mix the first and second mobile phases from the pumps 113 and 114, an injector 116 configured to inject a sample into the mixed mobile phase, a separating column 117 configured to separate target components in the sample, a detector 118 configured to detect the separated target components, a passage switching valve 119, a column switching valve 120, a downstream switching valve 127, a plurality of trap columns 121 to 125 disposed in parallel, a drain passage 126 disposed parallel to the plurality of trap columns, a diluent container 131 containing a diluent, a diluent pump 132 configured to pump the diluent, a column switching valve for diluent 133, and a control/processing unit 141. This embodiment is a gradient-type preparative liquid chromatograph that performs elution while changing a composition ratio of the plurality of mobile phases, however, this is not always the case. The embodiment may perform isocratic elution while keeping a constant composition of the mobile phases.

The separating column 117 is in connection with the injector 116 at its inlet end and with the detector 118 at its outlet end. The detector 118 may be any detector for a liquid chromatograph such as an absorbance detector and a refractive index detector.

The passage switching valve 119 has ports h to m. The passage switching valve 119 switches between two states: a first state and a second state. In the first state, two adjacent ports are in connection with each other as shown by the solid lines in FIG. 1. In the second state, two adjacent ports are in connection with each other as shown by the broken lines in FIG. 1. In both the first and second states, each port is in communication with one of the adjacent ports. The port j of the passage switching valve 119 is in connection with the outlet end of the detector 118. The ports h and j are in connection with drain ports (not shown).

The column switching valve 120 has ports a to g and selectively connects the port g with one of the ports a to f. The port g of the column switching valve 120 is in connection with the port k of the passage switching valve 119. The ports a to e are in connection with the inlet ends of the trap columns 121 to 125, respectively, and the port f is in connection with the inlet end of the drain passage 126.

The downstream switching valve 127 selectively connects one of the outlet ends of the trap columns 121 to 125 or the outlet end of the drain passage 126 with an outlet passage 128. The downstream switching valve 127 is operated interlockingly with the column switching valve 120. When the column switching valve 120 is operated to select one of the trap columns 121 to 125 or the drain passage 126, the downstream switching valve 127 is also operated to select the same trap column or drain passage.

The port m of the passage switching valve 119 is in connection with the diluent pump 132 and the port l is in connection with the column switching valve for diluent 133. By operating the column switching valve for diluent 133, the diluent supplied by the diluent pump 132 and through the ports m and l of the passage switching valve 119 is introduced into the flow of the eluate in upstream vicinities of the trap columns 121 to 125 or midway in the drain passage. The column switching valve for diluent 133 is operated interlockingly with the column switching valve 120. When the column switching valve 120 is operated to select one of the trap columns 121 to 125 or the drain passage 126, the column switching valve for diluent 133 is also operated to select the same trap column or drain passage.

The control/processing unit 141 including a CPU and a memory controls individual parts of the preparative liquid chromatograph of this embodiment according to predetermined programs and processes detection signals from the detector 118. The control/processing unit 141 is connected with an input unit 142 including a key board and a pointing device such as a mouse for the user to input instructions.

Figure 3:
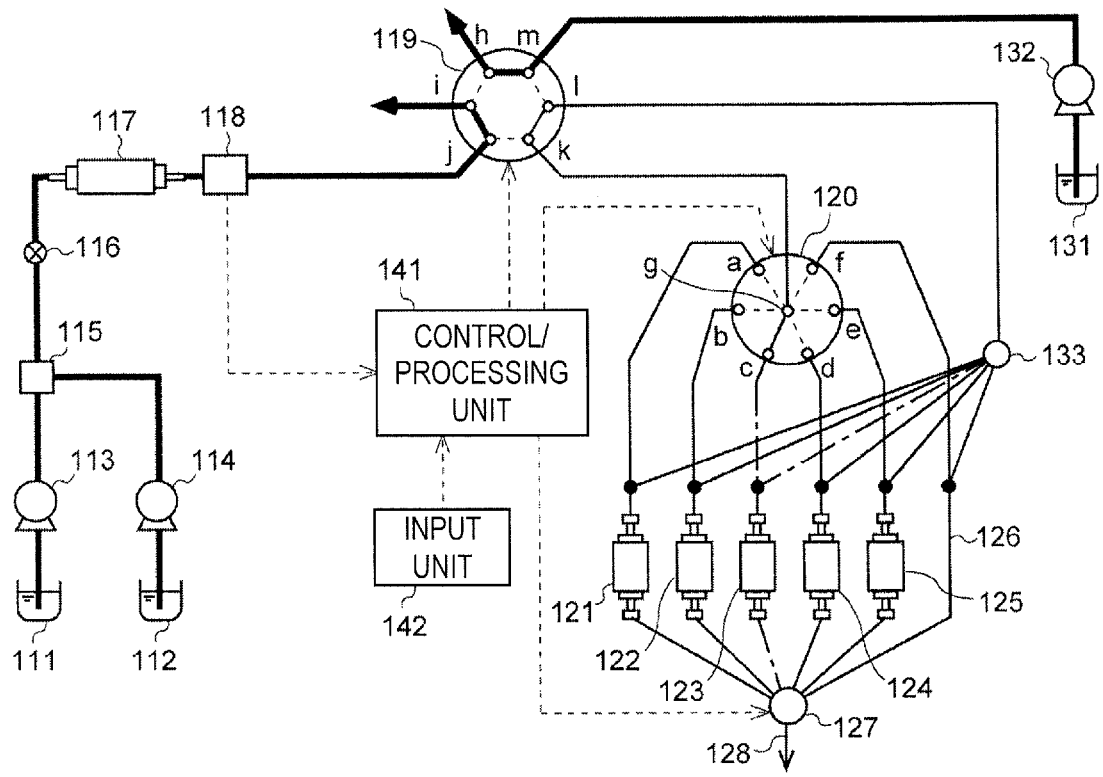
FIG. 3 shows a state in which a column switching valve is selecting a trap column after being operated from the state in FIG. 2.
Figure 4:
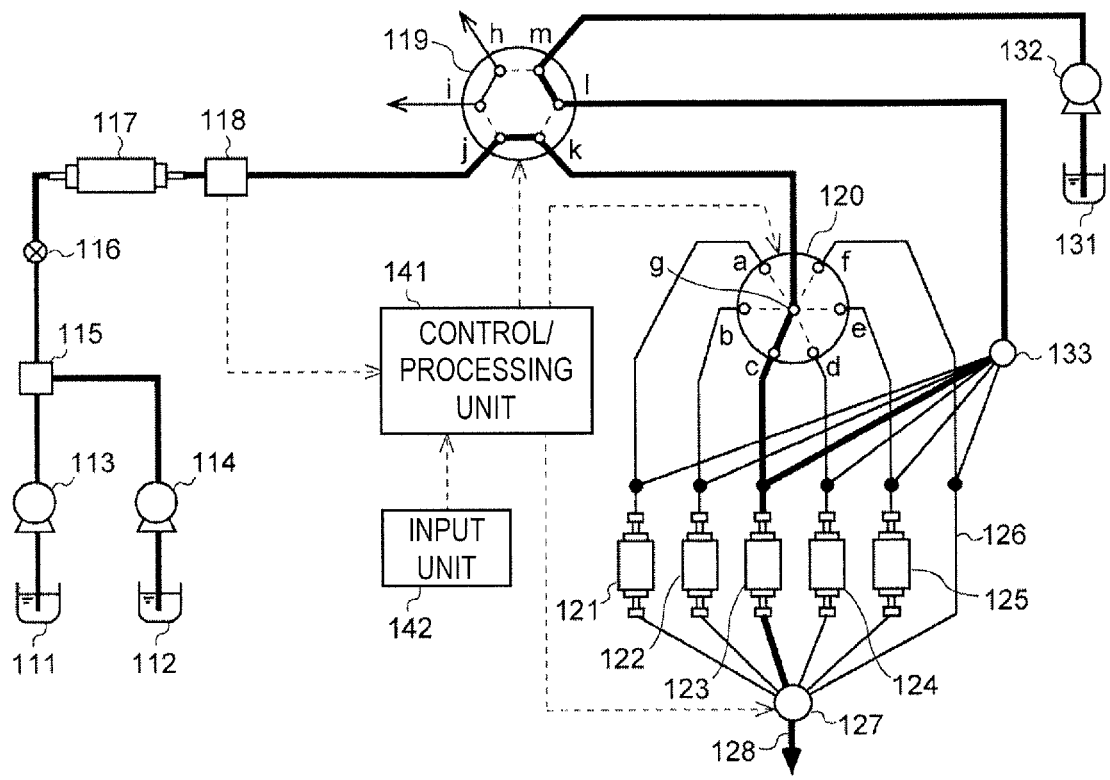
FIG. 4 shows a state in which the passage switching valve is in a first state after being operated from the state in FIG. 3.
Figure 5:
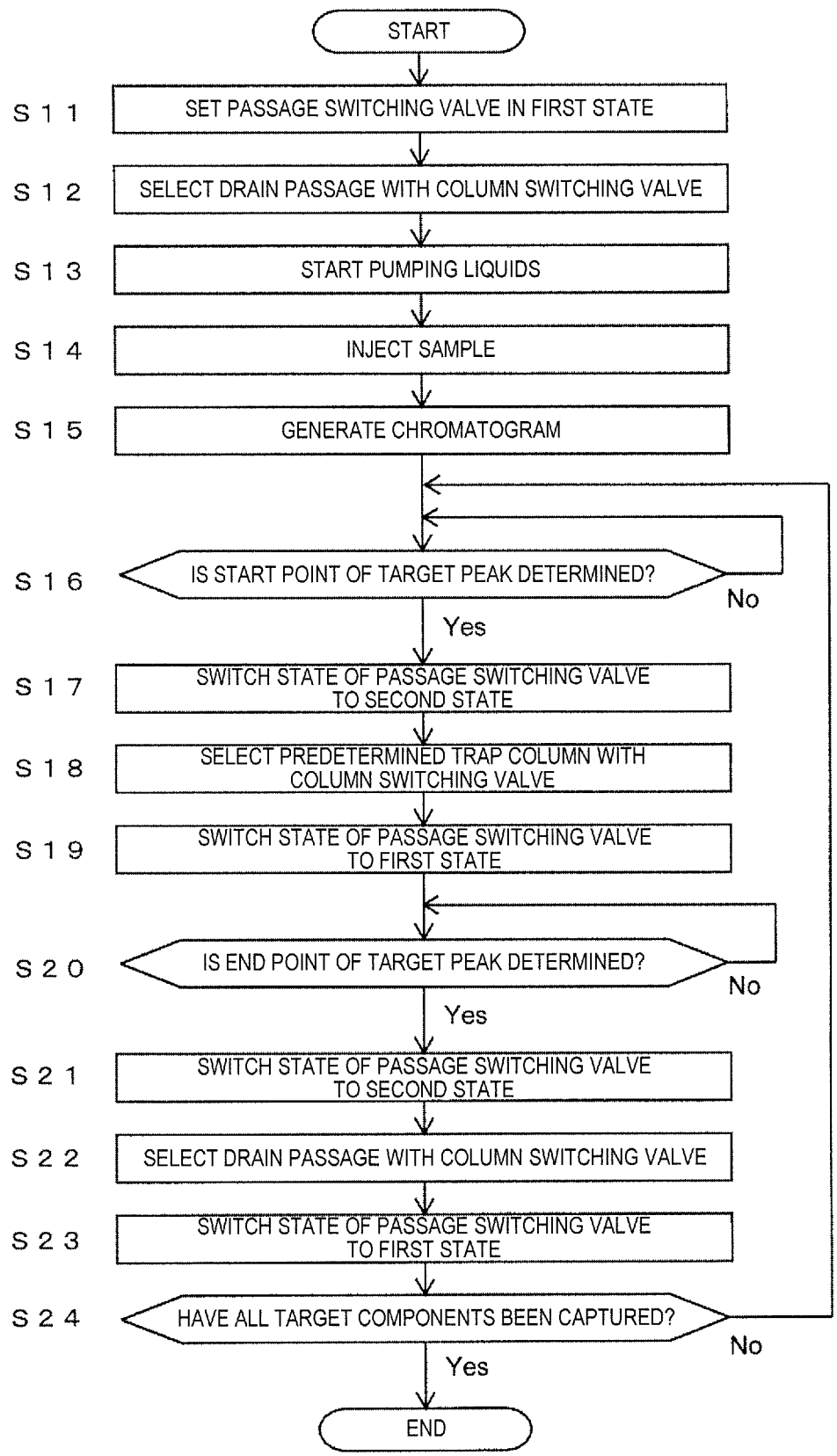
FIG. 5 is a flow chart showing the operation of a control/processing unit of the preparative liquid chromatograph according to the same embodiment.

The operation of the preparative chromatograph apparatus of this embodiment will be described with reference to FIGS. 1 to 4 and a flow chart in FIG. 5. FIGS. 1 to 4 show passages having a flow of liquid in thick lines and passages selected by the column switching valve 120 or the column switching valve for diluent 133 but having no flow of liquid in dot-dash lines.

In the preparative chromatograph apparatus of this embodiment, upon receipt of the user's instructions as to starting the separation of a sample and the capture of a target component through the input unit 142, the control/processing unit 141 sets the passage switching valve 119 in the first state (step S11), and controls the column switching valve 120 to select the port f (i.e. the drain passage) (step S12). When operating the column switching valve 120, the control/processing unit 141 also operates the downstream switching valve 127 and the column switching valve for diluent 133 to select the drain passage 126. The control/processing unit 141 then controls the first mobile phase pump 113, the second mobile phase pump 114, and the diluent pump 132 to start pumping the mobile phases and the diluent (step S13). As shown in FIG. 1, this causes the mobile phases pumped by the first and second mobile phase pumps 113 and 114 to pass through the mixer 115, the injector 116, the separating column 117, and the detector 118, and further through the ports j and k of the passage switching valve 119 and the ports g and f of the column switching valve 120, and enter the drain passage 126. After passing through the drain passage 126, the mobile phase passes through the downstream switching valve 127 to be discharged from the outlet passage 128. During this time, the diluent pumped by the diluent pump 132 passes through the ports m and l of the passage switching valve 119 and the column switching valve for diluent 133 to be introduced into the mobile phase in the drain passage 126.

The control/processing unit 141 then controls the injector 116 to inject a sample into the mobile phase (step S14). This causes the sample to flow with the mobile phase and enter the separating column 117. The separating column 117 separates the components in the sample and the detector 118 detects the separated components one by one. Based on a detection signal from the detector 118, the control/processing unit 141 starts generating a chromatogram with the horizontal axis showing the retention time and the vertical axis showing the signal intensity (step S15), and determines, for each target component, whether the start point of the peak of the target component appears or not based on the inclination of a curve in the chromatogram (step S16). The control/processing unit 141 determines the start point of the peak when the upward inclination of the curve exceeds a predetermined value in the chromatogram, for example. The control/processing unit 141 determines whether a certain peak is the peak of the target component or not based on the approximate retention time provided by the user in advance.

Figure 2:
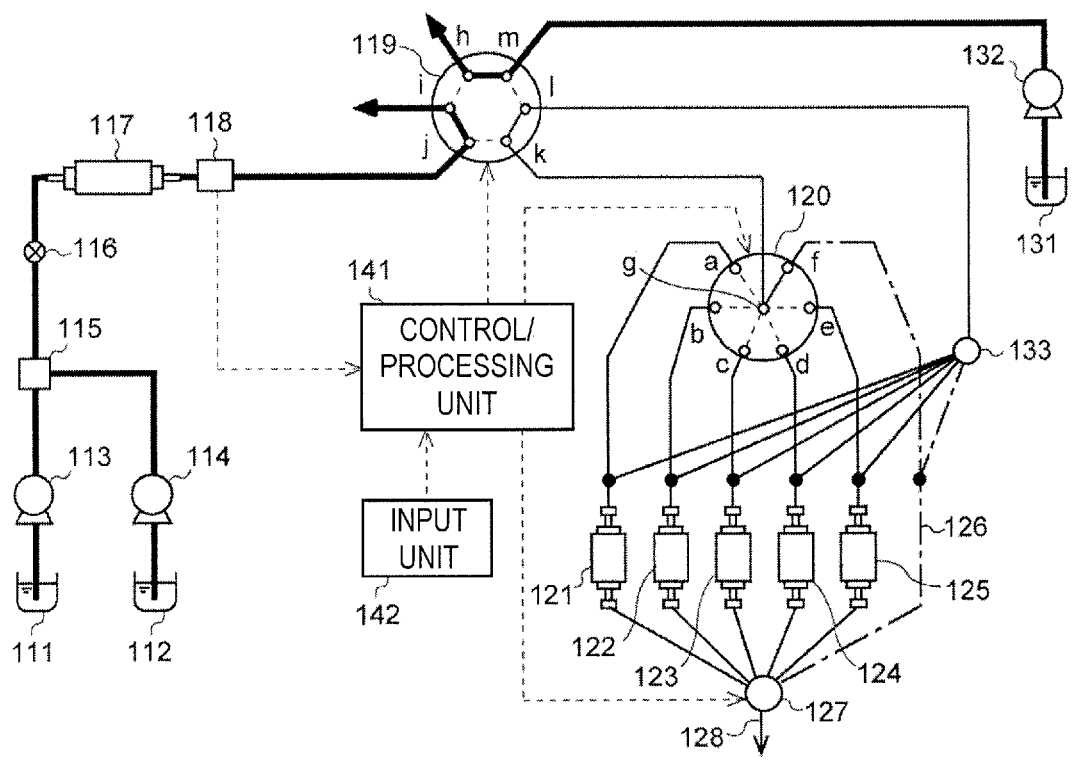
FIG. 2 shows a state in which a passage switching valve is in a second state after being operated from the state in FIG. 1.

When the control/processing unit 141 determines the start point of the peak of the target component in the chromatogram (i.e. if Yes in S16), the control/processing unit 141 switches the state of the passage switching valve 119 to the second state (step S17). As shown in FIG. 2, this causes the eluate from the detector 118 to pass through the ports j and i of the passage switching valve 119 to be discharged from a drain port (not shown). This switching operation of the passage switching valve 119 also causes the diluent pumped by the diluent pump 132 to pass through the ports m and h of the passage switching valve 119 to be discharged from another drain port (not shown). As a result, neither the eluate from the separating column 117 nor the diluent is present in the passage from the port k of the passage switching valve 119 to the column switching valve 120, all the intra-valve passages of the column switching valve 120, the drain passage 126, and the passages to the outlet passage 128 via the downstream switching valve 127 (see FIG. 2).

The control/processing unit 141 then operates the column switching valve 120 to select a predetermined trap column (the trap column 123 in this case) (step S18). When operating the column switching valve 120, the control/processing unit 141 also operates the downstream switching valve 127 and the column switching valve for diluent 133 to select the trap column 123 (see FIG. 3).

After the selection of the trap column 123 has been finished, the control/processing unit 141 switches the state of the passage switching valve 119 to the first state upon the arrival of the part of the eluate at the start point of its peak from the detector 118 at the passage switching valve 119 (step S19). As shown in FIG. 4, this causes the eluate at the start point of its peak and later to pass through the ports j and k of the passage switching valve 119 and the ports g and c of the column switching valve 120, and enter the trap column 123. As a result, the target component in the eluate is captured by the absorbent in the trap column 123 and the solution without the target component passes through the downstream switching valve 127 to be discharged from the outlet passage 128. During this time, the diluent pumped by the diluent pump 132 is introduced into the flow of the eluate in an upstream vicinity of the trap column 123.

While the trap column 123 is capturing the target component, the control/processing unit 141 monitors the inclination in the chromatogram and determines, at regular time intervals, whether the end point of the peak of the target component appears or not (step S20). The control/processing unit 141 may determine the end point of the peak when the downward inclination of the curve falls below a predetermined value in the chromatogram, for example. The method for determining the start point and the end point of the peak is not limited to the above method and may be any conventional method.

After the control/processing unit 141 has determined that the end point of the peak of the target component in the chromatogram appears (i.e. if Yes in S20), the control/processing unit 141 switches the state of the passage switching valve 119 to the second state upon the arrival of the part of the eluate at the end point of its peak from the detector 118 at the column switching valve 120 (step S21). As shown in FIG. 3, this prevents the eluate at the end point of its peak and later from entering the trap column 123 and causes the eluate to pass through the ports j and i of the passage switching valve 119 to be discharged instead. The diluent also stops entering the trap column 123 and passes through the ports m and h of the passage switching valve 119 to be discharged.

The control/processing unit 141 then operates the column switching valve 120 to select the drain passage 126 (step S22). When operating the column switching valve 120, the control/processing unit 141 also operates the downstream switching valve 127 and the column switching valve for diluent 133 to select the drain passage (see FIG. 2).

The control/processing unit 141 then switches the state of the passage switching valve 119 to the first state (step S23). As a result, as shown in FIG. 1, the eluate from the detector 118 restarts passing through the passage switching valve 119, the column switching valve 120, the drain passage 126, and the downstream switching valve 127 to be discharged from the outlet passage 128. This prevents the eluate with no target component from entering the trap columns 121 to 125 and disposes of the eluate. If some of the target component that should have been captured in the trap column 123 remains in the piping between the port k of the passage switching valve 119 and the port g of the column switching valve 120 and in the intra-valve passage of the column switching valve 120, the flow of the eluate with no target component washes the residual target component away to dispose of the residual target component via the drain passage 126, which prevents the residual target component from entering a wrong trap column. Since the passage switching valve 119 is reset to the first state in step S23, the diluent pumped by the diluent pump 132 also passes through the passage switching valve 119 and the column switching valve for diluent 133 and enters the drain passage 126 to be discharged together with the eluate from the outlet passage 128.

After finishing the collection of one target component as described above, the control/processing unit 141 determines whether all the target components have been captured as planned or not (step S24). When all the target components have not been captured yet (i.e. if No in step S24), the control/processing unit 141 returns the process back to step S16, and executes steps S17 to S24 again upon the appearance of the start point of the next target peak. The control/processing unit 141 then repeats steps S16 to S24 until the condition is satisfied (Yes) in step S24. Needless to say, since the trap column 123 is used for capturing a target component in the above description, another trap column should be used for capturing the next target component.

As described above, in the preparative liquid chromatograph of this embodiment, the passage switching valve 119 is operated to prevent the entry of an eluate into the column switching valve 120 before the switching operation of the column switching valve 120. Therefore, the eluate containing a target component is prevented from entering a wrong trap column during the switching operation of the column switching valve 120. As a result, the preparative liquid chromatograph of this embodiment collects a target component at higher purity than conventional preparative liquid chromatographs.

Figure 6:
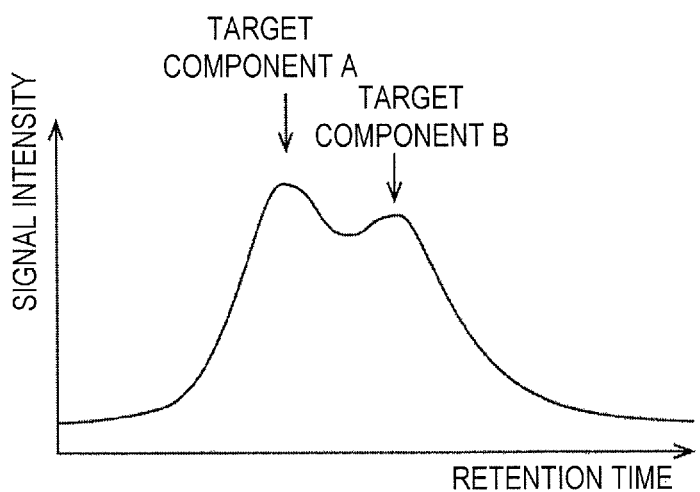
FIG. 6 shows a chromatogram generated by the control/processing unit.

In the above example, the switching operation of the column switching valve 120 is performed only when the passage switching valve 119 is in the second state. In this case, however, the switching among the trap columns takes a longer time as compared to conventional cases. When the retention times of two target components A and B to be captured are close to each other as shown in FIG. 6, the collection of the component eluted later (the target component B) may be delayed and the collection efficiency of this component may be decreased. To solve this problem, the preparative liquid chromatograph according to the present invention preferably has an additional mode in which the switching operation of the column switching valve 120 is performed while the passage switching valve 119 is in the first state. In a first operation mode (the additional mode), the switching operation of the column switching valve 120 is performed while the passage switching valve is in the first state. In a second operation mode (the mode used in the above embodiment), firstly the passage switching valve 119 is set in the second state, secondly the switching operation of the column switching valve 120 is performed, and thirdly the passage switching valve 119 is reset to the first state. The switching among the trap columns is performed more quickly in the first operation mode than in the second operation mode. When the peaks of target components are close to each other as described above, the operation in the first operation mode prevents the decrease in the collection efficiency of the target components. In the first operation mode, however, a target component present in the intra-valve passage of the column switching valve 120 may enter a wrong trap column during the switching operation of the column switching valve 120 and the purity of the collected target component may decrease as compared to the collection in the second operation mode. It is desirable that the user selects one of the operation modes in advance by weighing the purity with the collection efficiency.

In the above example, every time the capture in one trap column is finished, the switching to the drain passage 126 is performed before the next trap column is selected. In this case, however, when the retention times of plurality of target components are close to each other as described above, the collection of the component eluted later may be delayed and the collection efficiency of this component may be decreased. To solve this problem, in the area where the retention times of target components are closed to each other, the preparative liquid chromatograph according to the present invention preferably switches to the next trap column, immediately after collecting the target component A eluted earlier without switching to the drain passage 126, and collect the target component B (i.e. the preparative liquid chromatograph according to the present invention preferably returns to step S16 immediately after the condition is satisfied (Yes) in step S20 in the flow chart in FIG. 5). To follow this procedure, the user may conduct a preliminary analysis of a sample to know the approximate retention times of the target components; decide, for each target component, whether the switching to the drain passage 126 is skipped or not; and store the instructions in the control/processing unit 141. Alternatively, the control/processing unit 141 may determine, in real time, whether the switching to the drain passage 126 is skipped or not based on the analysis results of a chromatogram. In this case, when the control/processing unit 141 determines that the target components A and B eluted one after another are close to each other in the chromatogram, the control/processing unit 141 controls the passage switching valve 119 and the column switching valve 120 not to perform the switching to the drain passage 126 between the capture of the target component A and the capture of the target component B. In this case, the piping from the detector 118 to the passage switching valve 119 should be relatively long so that it takes a sufficiently long time for the end point of the previous peak to reach the passage switching valve 119 after the determination by the control/processing unit 141. When the collection efficiency is especially important, the switching to the drain passage may be skipped in the area in which the retention times of two target components are close to each other while the first operation mode is applied.

Embodiments of the present invention has been described by way of examples, however, the present invention is not limited to the above embodiments and can be modified within the scope of the claims of the present invention.

Figure 7:
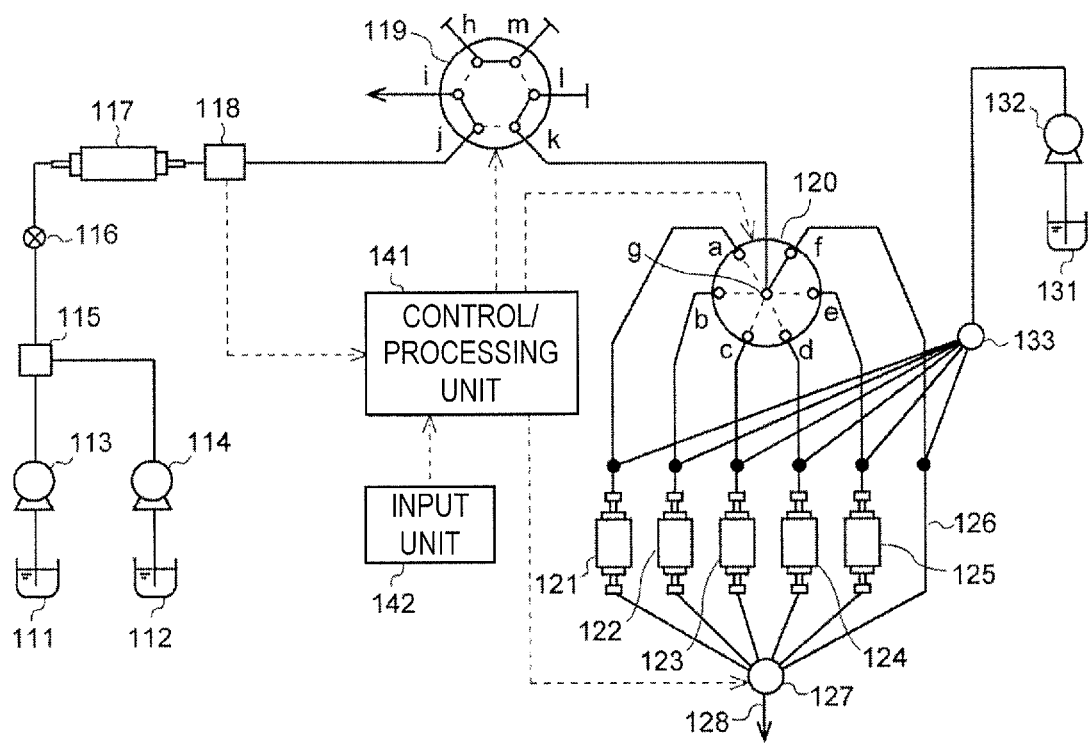
FIG. 7 is a schematic diagram of a structure of a preparative liquid chromatograph according to another embodiment of the present invention.

In the above embodiments, the diluent pump 132 is in indirect connection with the column switching valve for diluent 133 via the passage switching valve 119, however, this is not always the case. As described in FIG. 7, the diluent pump 132 may be in direct connection with the column switching valve for diluent 133.

Figure 8:
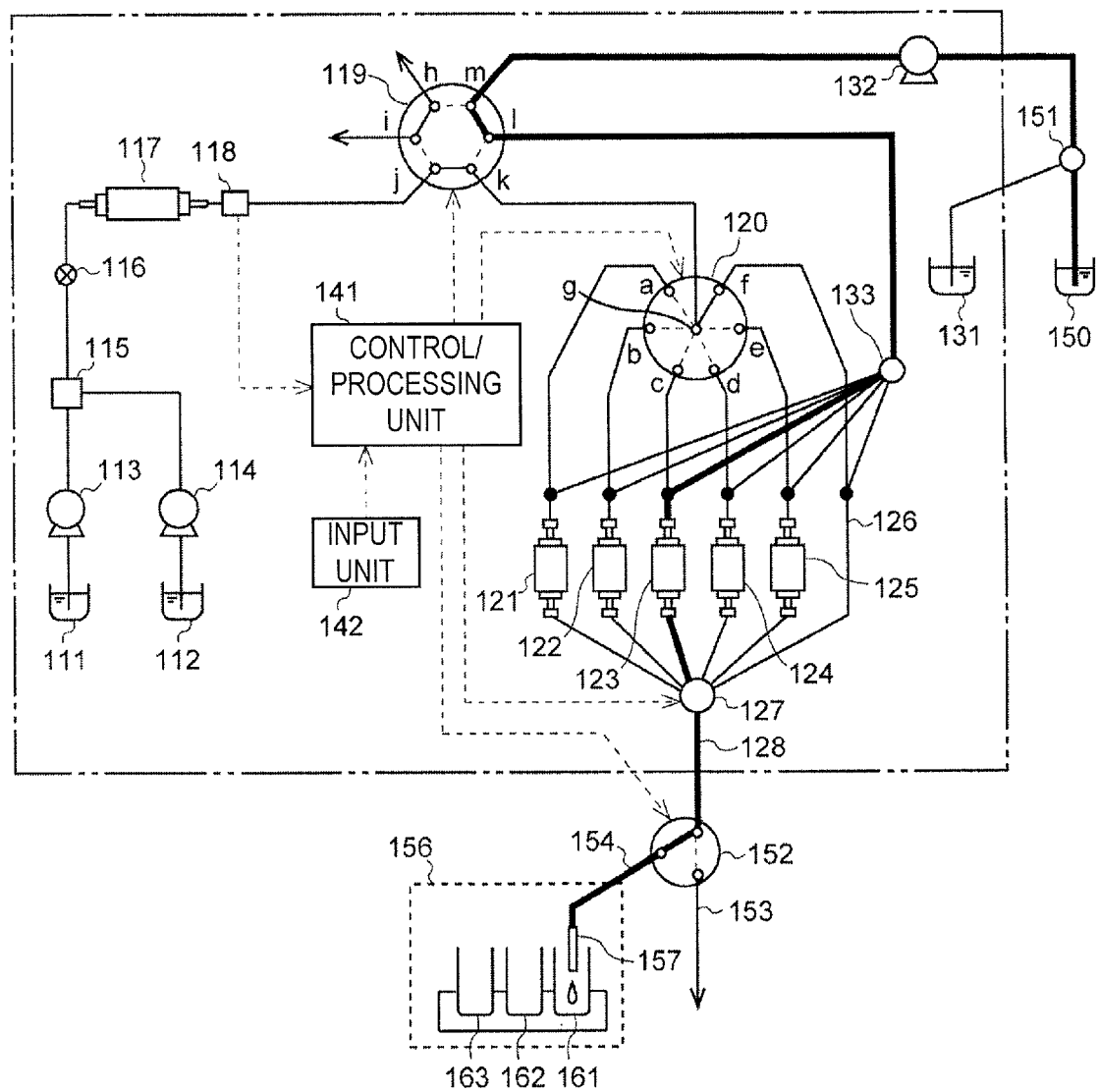
FIG. 8 is a schematic diagram of a structure of a preparative separation/purification system according to an embodiment of the present invention.
Figure 9:
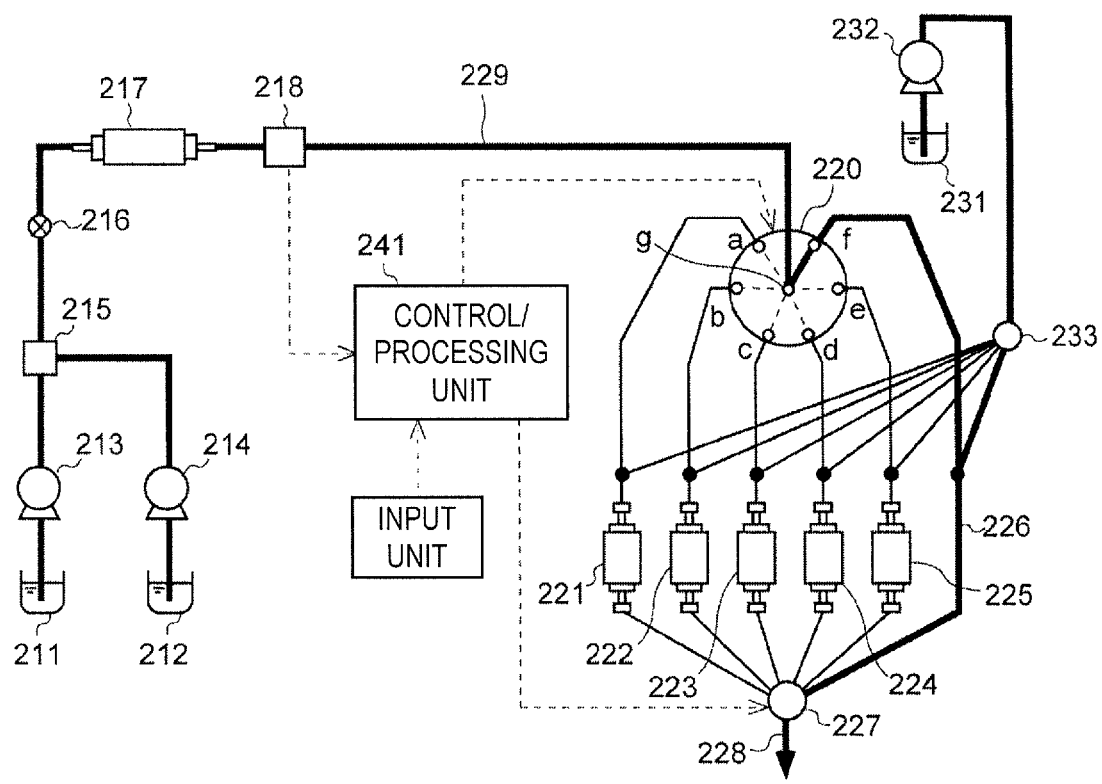
FIG. 9 is a schematic diagram of a structure of a conventional preparative liquid chromatograph.

In the above embodiments, the present invention is a preparative chromatograph apparatus that separates target components in the separating column 117 and captures the target components in the trap columns 121 to 125, however, this is not always the case. The present invention may be a preparative separation/purification system further having a mechanism that elutes the captured target components from the trap columns and a mechanism that collects the eluted target components. FIG. 8 shows a structure of this embodiment. In FIG. 8, a preparative chromatograph apparatus is surrounded by a dot-dot-dash line. FIG. 8 further shows an elution solvent/diluent switching valve 151, a collection/disposal switching valve 152, a disposal passage 153, a collection passage 154, and a target component collecting unit 156. These additional components constitute a preparative separation/purification system together with the preparative chromatograph apparatus. In FIG. 8, the structural elements identical to or corresponding to the structural elements in FIG. 1 are provided with the same reference signs. The detailed description of these structural elements may be omitted.

The following describes how the preparative separation/purification system collects the target components captured in the trap columns. Here, the trap columns 121 to 125 have already finished capturing the target components and the first and second mobile phase pumps 113 and 114 and the diluent pump 132 have already stopped their operation. The control/processing unit 141 sets the passage switching valve 119 in the first state to connect the port m and the port l of the passage switching valve 119 while operating the column switching valve for diluent 133 and the downstream switching valve 127 to select a predetermined trap column (e.g. the trap column 123). At this time, the collection/disposal switching valve 152 is in connection with the disposal passage 153. The control/processing unit 141 then sets the elution solvent/diluent switching valve 151 toward the elution solvent and controls the pump 132 to pump the elution solvent from a solvent container 150 into the trap column 123.

The elution solvent enters the trap column 123 and elutes the target component captured by the absorbent in the trap column 123. The control/processing unit 141 then calculates a time t1 necessary for discharging the mobile phase from the trap column 123 based on the capacity of the trap column 123 (the amount of the mobile phase in the trap column 123 immediately before the entry of the elution solvent) and the flow rate of the elution solvent pumped by the pump 132. When the time t1 has passed since the entry of the elution solvent, the control/processing unit 141 sets the collection/disposal switching valve 152 toward the collection passage 154 and starts collecting the target component in a predetermined collecting container 161. In this way, the eluate containing the target component passes through the collection passage 154 and drops down from an ejection nozzle 157 of the target component collecting unit 156 to be collected in the predetermined collecting container 161.

After some time has passed since the entry of the elution solvent into the trap column 123, the target component in the eluate decreases in concentration. When a predetermined time has passed since the start of the collection or a predetermined amount of the elution solvent has been supplied, the control/processing unit 141 sets the collection/disposal switching valve 152 toward the disposal passage 153 to finish the collection of the target component.

To collect another target component from another trap column, the control/processing unit 141 sets the passage switching valve 119 in the second state to connect the port m and the port h of the passage switching valve 119 for discharging the elution solvent through the drain port. The control/processing unit 141 then controls the column switching valve for diluent 133 and the downstream switching valve 127 to select the next trap column (e.g. the trap column 122) and controls a driving mechanism (not shown) in the target component collecting unit 156 to insert the ejection nozzle 157 into a new collecting container (e.g. a collecting container 162). The control/processing unit 141 then resets the passage switching valve 119 to the first state, and supplies the elution solvent and operates the collection/disposal switching valve 152 as described above to elute the target component from the trap column 122 and collect the eluted target component in the collecting container 162.

After the eluates containing different target components have been collected in the respective collecting containers 161 to 163 in the above manner, the eluates are heated or centrifuged under vacuum to collect the target components in solid forms.

REFERENCE SIGNS LIST

111, 211 . . . First Mobile Phase Container
112, 212 . . . Second Mobile Phase Container
113, 213 . . . First Mobile Phase Pump
114, 214 . . . Second Mobile Phase Pump
115, 215 . . . Mixer
116, 216 . . . Injector
117, 217 . . . Separating Column
118, 218 . . . Detector
119 . . . Passage Switching Valve
120, 220 . . . Column Switching Valve
121 to 125, 221 to 125 . . . Trap Column
126, 226 . . . Drain Passage
127, 227 . . . Downstream Switching Valve
128, 228 . . . Outlet Passage
131, 231 . . . Diluent Container
132, 232 . . . Diluent Pump
133, 233 . . . Column switching valve for diluent
141, 241 . . . Control/Processing Unit
150 . . . Solvent Container
151 . . . Elution Solvent/Diluent Switching Valve
152 . . . Collection/Disposal Switching Valve
153 . . . Disposal Passage
154 . . . Collection Passage
156 . . . Target Component Collecting Unit
157 . . . Ejection Nozzle
161 to 163 . . . Collecting Container

The invention claimed is:

1. A preparative liquid chromatograph comprising:
  a) a liquid chromatograph including a separating column configured to separate components in a sample and a detector configured to detect components in an eluate from the separating column;
  b) a plurality of trap columns configured to capture respective target components in the eluate;
  c) a column switching device configured to switch passages to cause an eluate having passed through the detector to selectively flow into one of the plurality of trap columns;
  d) a passage switching device disposed in a passage between the detector and the column switching device and configured to switch between a first state in which the eluate flows to the column switching device, and a second state in which the eluate is discharged without flowing to the column switching device; and
  e) a controller configured to control the passage switching device and the column switching device, for a switching operation of the column switching device, to firstly set the passage switching device in the second state, secondly perform the switching operation of the column switching device, and thirdly reset the passage switching device to the first state,
  wherein when the controller is configured to set the passage switching device in the second state, the controller is further configured to determine when a start point of a target peak pf a target component of the respective components is detected, and switch the passage switching device to the second state when the controller determines that the start point of the target peak is detected.

2. The preparative liquid chromatograph according to claim 1, further comprising:
f) a drain passage disposed parallel to the plurality of trap columns,
wherein the column switching device switches passages to cause the eluate having passed through the detector to selectively flow into one of the plurality of trap columns or the drain passage.

3. The preparative liquid chromatograph according to claim 1, further comprising:
g) a diluent supplier configured to supply a diluent, and
h) a column switching device for diluent configured to switch passages to cause the diluent to selectively flow into one of the plurality of trap columns,
wherein the passage switching device is disposed in the passage between the detector and the column switching device and in a passage between the diluent supplier and the column switching device for diluent, the passage switching device connects the detector with the column switching device and connects the diluent supplier with the column switching device for diluent in the first state, and
wherein the passage switching device connects the detector with a first drain passage and connects the diluent supplier with a second drain passage in the second state.

4. The preparative liquid chromatograph according to claim 1,
wherein the controller is further configured to perform a first operation mode in which the controller controls the passage switching device and the column switching device to perform the switching operation of the column switching device while the passage switching device is in the first state; and a second operation mode in which the controller controls the passage switching device and the column switching device to firstly set the passage switching device in the second state, secondly perform the switching operation of the column switching device, and thirdly reset the passage switching device to the first state, and
wherein the preparative liquid chromatograph further comprises:
i) a setting device configured to allow a user to select between the first operation mode and the second operation mode in advance when collecting a target component in the sample.

5. The preparative liquid chromatograph according to claim 1, wherein when the controller is configured to perform the switching operation of the column switching device, the controller is further configured to operate the column switching device to select a predetermined trap column of the plurality of trap columns.

6. The preparative liquid chromatograph according to claim 5, wherein when the controller is configured to reset the passage switching device to the first state, the controller is further configured to switch the passage switching device to the first state upon arrival of a part of the eluate at the start point of the target peak at the passage switching device.

7. The preparative liquid chromatograph according to claim 6, wherein the controller is further configured to determine when an end point of the target peak of the target component of the respective target components is detected, and switch the passage switching device to the second state upon arrival of a part of the eluate at the end point of the target peak at the column switching device.

8. A preparative separation/purification system comprising:
a preparative liquid chromatograph configured to capture a plurality of target components separated by a separating column in individual trap columns;
an elution solvent supplying device configured to supply an elution solvent to an entrance of a trap column capturing a target component; and
a collecting device configured to collect a target component caused to flow out of an exit of the trap column by supply of the elution solvent,
wherein the preparative liquid chromatograph comprises:
a liquid chromatograph including a separating column configured to separate components in a sample and a detector configured to detect components in an eluate from the separating column;
a plurality of trap columns configured to capture respective target components in the eluate;
a column switching device configured to switch passages to cause an eluate having passed through the detector to selectively flow into one of the plurality of trap columns;
a passage switching device disposed in a passage between the detector and the column switching device and configured to switch between a first state in which the eluate flows to the column switching device, and a second state in which the eluate is discharged without flowing to the column switching device; and
a controller configured to control the passage switching device and the column switching device, for a switching operation of the column switching device, to firstly set the passage switching device in the second state, secondly perform the switching operation of the column switching device, and thirdly reset the passage switching device to the first state,
wherein when the controller is configured to set the passage switching device in the second state, the controller is further configured to determine when a start point of a target peak of a target component of the respective target components is detected, and switch the passage switching device to the second state when the controller determines that the start point of the target peak is detected.

9. The preparative separation/purification system according to claim 8, wherein when the controller is configured to perform the switching operation of the column switching device, the controller is further configured to operate the column switching device to select a predetermined trap column of the plurality of trap columns.

10. The preparative separation/purification system according to claim 9, wherein when the controller is configured to reset the passage switching device to the first state, the controller is further configured to switch the passage switching device to the first state upon arrival of a part of the eluate at the start point of the target peak at the passage switching device.

11. The preparative separation/purification system according to claim 10, wherein the controller is further configured to determine when an end point of the target peak of the target component of the respective target components is detected, and switch the passage switching device to the second state upon arrival of a part of the eluate at the end point of the target peak at the column switching device.

12. A preparative liquid chromatograph comprising:
a liquid chromatograph including a separating column configured to separate components in a sample and a detector configured to detect components in an eluate from the separating column;
a plurality of trap columns configured to capture respective target components in the eluate;
a column switching device configured to switch passages to cause an eluate having passed through the detector to selectively flow into one of the plurality of trap columns;
a passage switching device disposed in a passage between the detector and the column switching device and configured to switch between a first state in which the eluate flows to the column switching device, and a second state in which the eluate is discharged without flowing to the column switching device;
a controller configured to control the passage switching device and the column switching device, for a switching operation of the column switching device, to set the passage switching device in the second state, perform the switching operation of the column switching device, and reset the passage switching device to the first state; and
a diluent supplier configured to supply a diluent,
wherein, in the second state, the passage switching device connects the detector with a first drain passage and connects the diluent supplier with a second drain passage, and
wherein when the controller is configured to set the passage switching device in the second state, the controller is further configured to determine when a start point of a target peak of a target component of the respective target components is detected, and switch the passage switching device to the second state when the controller determines that the start point of the target peak is detected.

13. The preparative liquid chromatograph according to claim 12, further comprising:
a diluent column switching device configured to switch passages to cause the diluent to selectively flow into one of the plurality of trap columns,
wherein the passage switching device is disposed in a passage between the diluent supplier and the diluent column switching device, and
wherein the passage switching device connects the detector with the column switching device and connects the diluent supplier with the diluent column switching device in the first state.

14. The preparative liquid chromatograph according to claim 12, further comprising:
a drain passage disposed parallel to the plurality of trap columns,
wherein the column switching device switches passages to cause the eluate having passed through the detector to selectively flow into one of the plurality of trap columns or the drain passage.

15. The preparative liquid chromatograph according to claim 12,
wherein the controller is further configured to perform a first operation mode in which the controller controls the passage switching device and the column switching device to perform the switching operation of the column switching device while the passage switching device is in the first state; and a second operation mode in which the control device controls the passage switching device and the column switching device to firstly set the passage switching device in the second state, secondly perform the switching operation of the column switching device, and thirdly reset the passage switching device to the first state, and
wherein the preparative liquid chromatograph further comprises a setting device for allowing a user to select between the first operation mode and the second operation mode in advance when collecting a target component in the sample.

* * * * *